United States Patent [19]

Borchardt

[11] Patent Number: 4,537,539
[45] Date of Patent: Aug. 27, 1985

[54] LASHING BAR

[76] Inventor: Dieter Borchardt, Rissener Dorfstr. 45, 2000 Hamburg 56, Fed. Rep. of Germany

[21] Appl. No.: 670,672

[22] Filed: Nov. 13, 1984

Related U.S. Application Data

[63] Continuation of Ser. No. 402,532, Jul. 28, 1982, abandoned.

[30] Foreign Application Priority Data

Aug. 10, 1981 [DE] Fed. Rep. of Germany ... 8123436[U]
Sep. 3, 1981 [DE] Fed. Rep. of Germany ... 8125939[U]

[51] Int. Cl.³ .............................................. B61D 45/00
[52] U.S. Cl. ................................ 410/77; 24/265 CD; 24/590; 114/75; 248/500; 403/348; 403/353; 410/32; 410/82
[58] Field of Search .............. 24/265 R, 265 CD, 287, 24/588, 590, 597; 211/105.1, 123; 248/500; 114/75; 403/348, 353; 410/11, 12, 23, 50, 31-43, 77, 82, 83, 85, 90, 91, 96-119

[56] References Cited

U.S. PATENT DOCUMENTS 2,177,215 10/1939 Hodgkinson ................. 24/221 K X
3,709,455 1/1973 Last ........................................ 410/85
4,096,816 6/1978 Patterson, III et al. ........ 248/500 X
4,194,429 3/1980 Wright ........................... 24/221 R X
4,249,840 2/1981 Kallaes et al. ..................... 410/85 X

FOREIGN PATENT DOCUMENTS 6809021 12/1969 Netherlands .......................... 114/75
197190 7/1965 Sweden .............................. 24/221 R

OTHER PUBLICATIONS

*Container-and Trailer-Lashing Systems*, Ozean Service & Reparator GmbH, (no date provided), Sales brochure.

Primary Examiner—William E. Lyddane
Assistant Examiner—James R. Brittain
Attorney, Agent, or Firm—Cushman, Darby & Cushman

[57] ABSTRACT

In order to adapt a container lashing bar to securely fasten its hooking-in fitting not only in the lower corner lateral openings of a standard shipping container, but also in the differently-shaped upper corner end openings, the usual hooking-in fitting which includes a pin with a locking lug extending from it is provided with a second locking lug extending in the same plane as the first, but in a substantially different angular direction. Particular mechanical design elaborations are described including replication of the two locking lugs in mirror image on the opposite end of the same pin, or on the same side of a similar pin provided on the opposite end of the bar.

5 Claims, 8 Drawing Figures

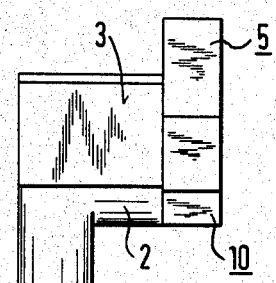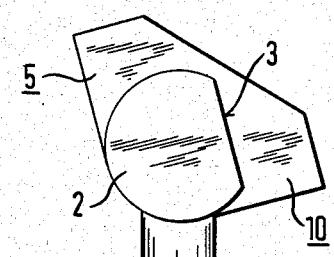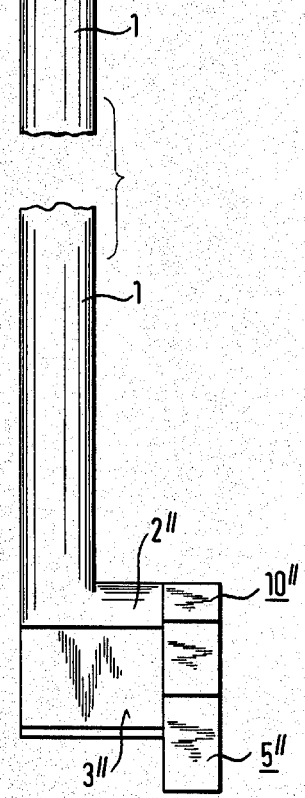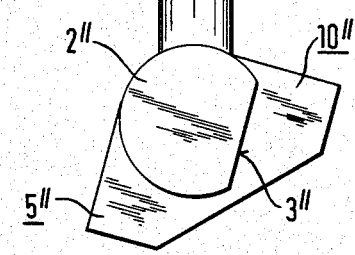
FIG. 7 FIG. 8

LASHING BAR

This is a continuation of application Ser. No. 402,532, filed July 28, 1982, (now abandoned).

BACKGROUND OF THE PRESENT INVENTION

Lashing bars conventionally are used, often in connection with other fastening devices such as turn buckles, e.g. for securing standard shipping containers, stacked in tiers or layers to the deck of a transport ship. Lashing assemblies incorporating lashing bars conventionally are anchored between particularly-shaped anchor openings provided at the edges or corners of the containers, and fixed anchor points on the ship. Often the individual lashing assemblies extend obliquely from a container corner, to one of the fixed anchor points on the ship.

The invention relates to a lashing bar for latching into an anchoring opening in a container corner, the bar having at one end a hooking-in fitting having a pin extending substantially perpendicularly to the bar and a locking lug which is attached to the pin and which extends at least substantially in the longitudinal direction of the bar and from the pin in the direction away from the remote bar end, the maximum width of the locking lug being smaller than the maximum width of the anchoring opening of a bottom or lower container corner, and the distance between the free end of the locking lug and its opposite end or that surface of the pin which is remote from the free end of the locking lug being smaller than the height of the anchoring opening of a bottom or lower container corner, but large enough for the locking lugs to engage in the clamping position behind the edge zone of the end-face anchoring opening of a top or upper container corner.

Lashing bars of the kind specified are used to fasten containers to ships' decks; the hooking-in fitting of the lashing bar latch, for example, into the anchoring openings of the top container corner of the first layer of containers, and also into the anchoring openings of the bottom container corners of the second container layer resting on such container layer, and are then so connected via clamping elements, for example, turnbuckles, to anchoring points on deck that the lashing bars extend preferably at an angle of 45°, but generally over an angular range of 20° to 50° in relation to the vertical, so as to absorb in this way both vertical and horizontal forces. The anchoring of the containers by such obliquely extending lashing bars also produces a diagonal stiffening of the container frames, so that they can be loaded with considerable forces operating in parallel with the standing plane.

The anchoring openings in the bottom container corners and the lateral anchoring openings in the top container corners which open outwardly of the container ends at the bottom corners, or outwardly of the container sides at the bottom corners, and those which open outwardly of the container sides at the top corners each have the same standarized shape and dimensions, namely the shape of a perpendicular rectangle with semi-circular ends, whose maximum nominal width is 51.00 mm. its maximum nominal height being 79.5 mm. The prior art lashing bars of the kind specified therefore have hooking-in fittings which are adapted to such anchoring aperture and whose locking lug engages, after the bar has been inserted and pivoted into the inclined clamping position, behind the edge zone of the anchoring opening, thus producing the positive connection between the lashing bar and the container.

In distinction from the anchoring openings of the aforementioned dimensions each of the anchoring openings (i.e. those which open outwardly of the container ends at the top corners provided on the end face of the top container corner is constructed for the engagement of crane hooks, and it has a shape and dimensions which differ from the other anchoring apertures, but which are also standardized, namely substantially the shape of a square with a semi-circular lower end and a slightly rounded top end, the maximum nominal width being 63.5 mm and the maximum nominal height 73.0 mm. Due to the greater width of these anchoring openings in comparison with the anchoring openings of the bottom container corners and the lateral anchoring openings of the top container corners, when the hooking-in fitting of a lashing bar is applied which is designed for the narrower anchoring openings and the bar is pivoted into the clamping position, the wall of the opening is engaged-behind slightly, but not adequately, by the locking lug, even if the locking lug is so long that it must be inserted in the diagonal of the wider anchoring opening. In practice, therefore, the prior art lashing bars of the kind specified are unsuitable for use with the end-face anchoring openings of the top container corners, or the anchoring obtained is very unreliable.

SUMMARY OF THE INVENTION

In contrast, it is an object of the invention to provide a lashing bar which has a hooking-in fitting which can be very simply latched-in and which both in the anchoring openings of the bottom container corners, and the lateral anchoring openings of the top container corners, and also in the end-face anchoring openings of the top container corners, enables the edge zones of the openings to be accurately and reliably engaged-behind, thus reliably locating the clamped lashing bar.

To solve this problem, the invention provides a lashing bar of the kind specified the construction of which is characterized in that disposed on the pin is an additional locking lug which extends substantially transversely of the pin and transversely of the locking lug and in the clamping position engages behind the edge zone, opposite the edge zone behind which the locking lug engages, of the end-face anchoring opening of a top container corner. In the lashing bar according to the invention, therefore, the hooking-in fitting has in addition to the conventional locking lug a further locking lug which lies substantially in the same plane as the conventional locking lug and which extends substantially transversely of the pin and transversely of the conventional locking lug. With a substantially downwardly extending bar, the additional locking lug can be introduced by tilting and lateral insertion into the anchoring opening, so that it engages behind the lateral edge zone of the anchoring opening wall, whereafter the conventional locking lug, which does not exceed the total height of the end-face anchoring opening of the top container corner, can be introduced into the anchoring opening. In this introduced position the bar can be pivoted into the clamping position—i.e., into a position of conventionally 20° to 50° in relation to the vertical, so that the pin is twisted and the locking lug guided behind the boundary wall of the anchoring opening. It is true that the additional locking lug, already engaging behind the opposite wall zone of the anchoring opening, is pivoted upwards, but it retains its position engaging behind the wall.

In the construction according to the invention the maximum distance between the free ends of the locking lug and the additional locking lug can be greater than the maximum height of the anchoring opening of a bottom container corner, so that in the clamping position, with both forms of anchoring openings, the locking lug and the additional locking lug mean that the anchoring aperture edge zones are firmly engaged-behind, without these dimensions of the locking lug and the additional locking lug having an adverse effect on introduction into the anchoring opening.

Of course, the additional locking lug, together with the pin, must be of dimensions such that it can also be introduced by being suitably inclined into the narrower anchoring opening—i.e., the dimensions must not be so large that the width of the narrow anchoring opening renders such introduction impossible. Suitable dimensions can be determined by very simple experiments; it should be mentioned that, for the introduction of the additional locking lug, the distance between a plane which intersects the surface of the additional locking lug facing the pin, and the generatrix or generating surface of the pin adjacent the free end of the additional locking lug, by the same angle in each case and whose intersection lines with the surface of the additional locking lug facing the pin and the generatrix or generated surface are at a distance from one another, which is equal to the wall thickness of the edge of the anchoring openings in the rectilinear opening zone, and a plane running parallel with such plane through the most far removed point of the additional locking lug and of the zone of the pin immediately adjoining the latter on the side opposite the free end of the additional locking lug should be smaller than the maximum width of the anchoring opening of the bottom container corner.

On introduction into the anchoring opening of a bottom container corner, the free end of the locking lug conventionally extends as far as the top, rounded-off zone of the anchoring opening, so that such free end can impede the introduction of the additional locking lug. To obviate this disadvantage, the side of the free end of the locking lug remote from the additional locking lug can be chamfered in the direction of the longitudinal axis of the pin. However, in that case the chamfering can be smaller or completely omitted if, for instance, the lower lateral surface of the additional locking lug extends at a slight angle upwards at the start of the pin-introducing operation and is then pivoted downwards, so that the free end of the locking lug is released from the edge of the anchoring opening.

In order to avoid the necessity of chamfering excessively the outside of the locking lug in the direction from the pin to its free end and to maintain the dimensions for the introduction of the additional locking lug into the narrower anchoring opening, the corresponding unobstructed space for such introduction can be produced by the pin being flattened on the side adjacent the free end of the additional locking lug; the flattening should start at a distance from the longitudinal axis of the bar.

Preferably, the lateral surface of the locking lug remote from the additional locking lug and the lateral surface of the additional locking lug remote from the locking lug enclose a right angle.

To enable the two locking lugs for engaging behind the wall zones to be pivoted as far as possible out of the introduction position into the clamping position, according to a feature of a preferred embodiment of the invention the longitudinal axis of the bar is inclined by about 5° to about 15° in relation to the longitudinal axis of the locking lug and away from the additional locking lug.

As a result, the hooking-in fitting is inserted into the anchoring opening with the bar extending at an angle of about 5° to about 15° to the vertical, and for the pivoting of the bar into the clamping position, a displacement is required first by such angle into the vertical, and then further by the particular angular range of about 20° to about 50° in relation to the vertical.

The lashing bar, equipped with locking lug and additional locking lug, is suitable on every occasion only for clamping in one direction—i.e., for example, viewed in plan in relation to an anchoring opening, only for the extension of the bar in the clamping position at an angle to the right downwards, or at an angle to the left downwards. However, if the bar of a lashing bar according to the invention inserted into the anchoring opening, which is constructed for anchoring to the right downwards, is pivoted to the left, even the use of force cannot move it as far as the corresponding clamping position, since during such pivoting the hooking-in fitting is lifted, while supporting the underside of the additional locking lug. As a result the locking lug bears against the covering wall of the container corner and thus blocks any further pivoting of the rod. This reliably prevents wrong use.

If in contrast a single lashing bar of the kind specified is intended for use for both lashing directions, according to an elaboration of the invention, on the side of the pin remote from the free end of the locking lug the bar is attached to the pin, and the pin is prolonged beyond the zone of connection to the bar and has at its end a further, laterally inverted (i.e. mirror image) arrangement of locking lug and additional locking lug.

Due to this laterally inverted arrangement of locking lug and additional locking lug, an arrangement is always available for such lashing direction, i.e. all that the user needs to do is to insert the particular arrangement of locking lug and additional locking lug suitable for the required lashing direction into the anchoring opening.

However, with such a laterally inverted arrangement, the part of the hooking-in fitting which is unused when the lashing bar is in the clamping position may prevent lashing bars from latching into anchoring openings situated higher up. To prevent this, according to a feature of a respective embodiment of the invention at each of its ends the bar has a pin bearing a locking lug and an additional locking lug which extend in substantially the same direction away from the bar, the additional locking lugs lying on the same side of the bar.

In a lashing bar constructed in this way the hooking-in fitting on one end of the bar is used for clamping in one lashing direction, the hooking-in fitting on the other end of the bar being used for clamping in the other lashing direction. The particular hooking-in fitting not in engagement with a anchoring opening can, for instance, be connected to the turnbuckle by which the lashing bar is clamped.

BRIEF DESCRIPTION OF THE DRAWINGS

The invention will now be described in greater detail with reference to the drawings, which show embodiments diagrammatically and in a simplified manner, and wherein:

FIGS. 7 and 8 are two views of a lashing bar having a hooking-in fitting according to the invention at each end.

DETAILED DESCRIPTION

Figure 1:
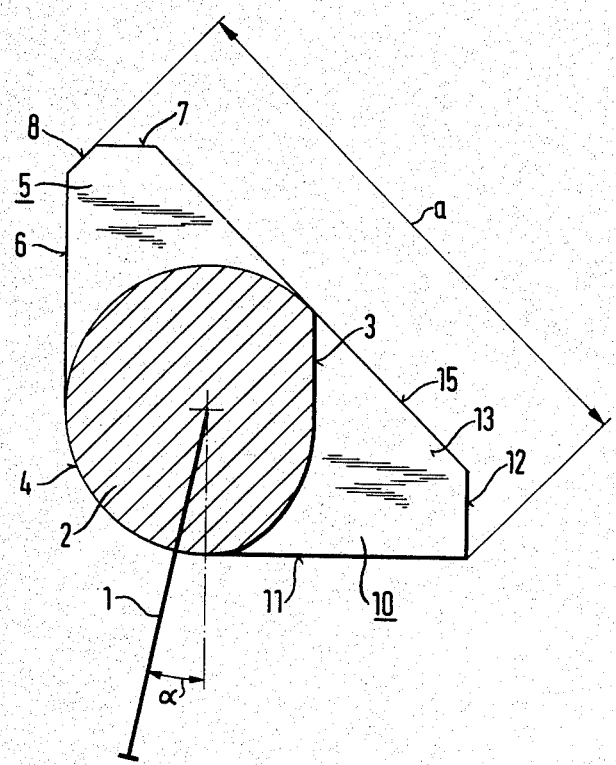
FIG. 1 is a longitudinal cross-sectional view of a first embodiment of the lashing bar, taken along the line I—I in FIG. 2, showing the hooking-in fitting of a lashing bar and the diagrammatically indicated bar.
Figure 2:
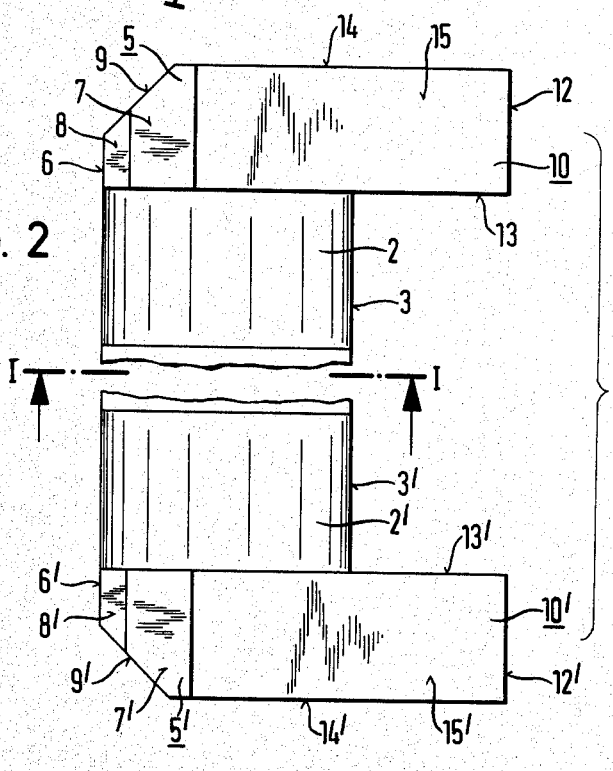
FIG. 2 is a fragmentary plan view of the hooking-in fitting shown in FIG. 1, with locking lugs and additional locking lugs arranged in a laterally inverted condition.

Referring to FIGS. 1 and 2, a hooking-in fitting has a pin 2, 2', to which a bar 1 (indicated diagrammatically in FIG. 1) is attached in the central zone that is broken away in FIG. 2. The pin extends substantially perpendicularly to the bar 1 and is inclined outwards and slightly upwards from the attaching zone of the bar. As can be seen from FIG. 2, a locking lug 5, 5' and an additional locking lug 10, 10' are provided in lateral inversion, i.e. in mirror image at both end of the pin. For the understanding of the invention, only the arrangement of locking lug 5 and the additional locking lug 10 is described, the laterally inverted arrangement being necessary only if the lashing bar is meant to be used for clamping in two directions.

As viewed in FIG. 1, the locking lug 5 extends upwards, so that an angle $\alpha$, for instance, between 5° and 15°, is formed between its longitudinal axis and the bar 1. The locking lug 5 has a lateral, i.e. outer edge surface 6 which extends tangentially in relation to the circular peripheral surface 4 of the pin 2 and which merges at the free end into a surface 8 extending inclined at an angle of about 45° and adjoined by a top end surface 7 extending perpendicularly to the lateral surface 6. Furthermore, the outer surface of the locking lug 5 extends over its largest zone 9 at 45° from the lateral surface 6 in the direction of the outer surface 14 of the additional locking lug 10. The importance of this chamfering will be explained hereinafter.

The additional locking lug 10 lies in the same plane as the locking lug 5 and has substantially the same thickness. It extends at right angles to the locking lug 5, in the sense that its lateral, i.e. outer edge surface 11 merges tangentially into the circular portion of the pin 2 extending at an angle of 90° in relation to the lateral surface 6 of the locking lug 5, i.e. so that an angle of 90° is included between the angularly opposite outer edge surfaces 6 and 11. Extending from the end surface 12 extending at right angles to the lateral surface 11 is a transverse surface 15 which is shared by the two locking lugs 5 and 10, extends at an angle of 45° to the lateral surfaces 6 and 11, and contacts the peripheral surface of the pin 2. The generally circular, cylindrical pin merges via a rounding zone of larger radius, which adjoins the transition of the lateral surface 11 into the circular peripheral surface 4 of the pin 2, into a flat zone 3, which extends parallel with the lateral surface 6, but might also be inclined in relation thereto. The flat zone 3 cooperates with surface 13 of the additional locking lug 10 facing the pin 2 to enclose a right angle.

Figure 3:
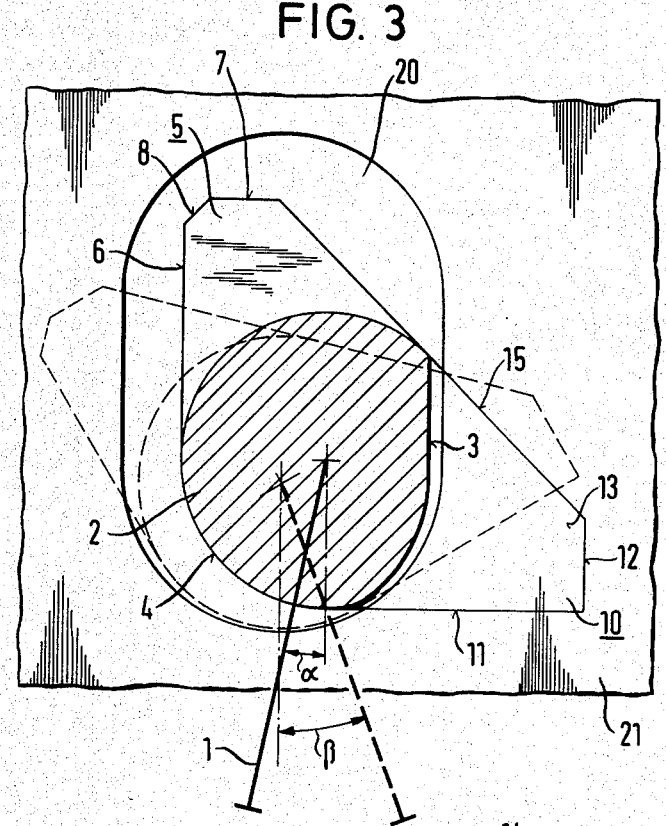
FIG. 3 shows the lashing bar, in a sectional manner similar to FIG. 1, but with two positions of the hooking-in fitting indicated, respectively in full and dashed lines in an anchoring opening of a bottom container corner.
Figure 4:
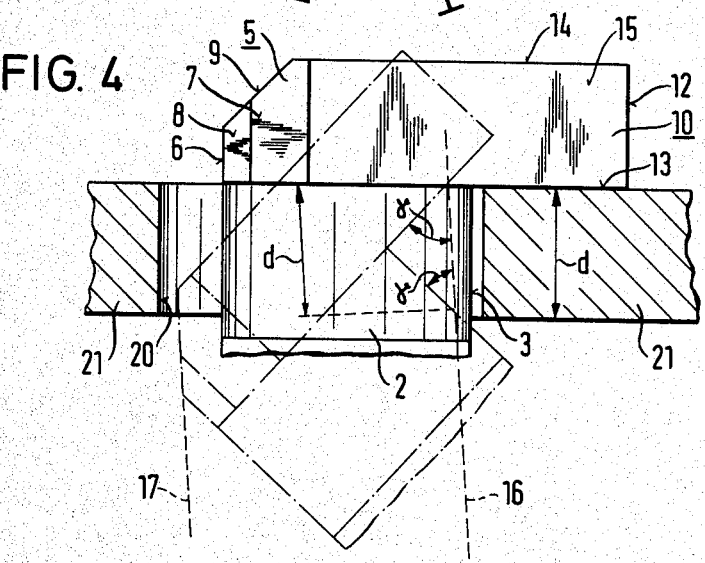
FIG. 4 is a plan view showing one of the two portions of the hooking-in fitting which is illustrated in FIG. 2, in two positions in relation to the anchoring opening of a bottom container corner, FIGS. 5 and 6, which correspond to FIGS. 3 and 4, show the hooking-in fitting in relation to the end-face anchoring opening of a top container corner.

The introduction and location of the lashing bar (FIGS. 1 and 2) in an anchoring opening 20 of a bottom container is shown diagrammatically in FIGS. 3 and 4. For introduction into the anchoring opening 20, the hooking-in fitting is placed at an angle (shown in chain-dot lines in FIG. 4) so as to move the additional locking lug 10 into the position shown in continuous lines in FIG. 4, in which it engages behind the wall 21 in the edge zone of the opening 20 and bears via the surface 13 against such wall. To make such introduction into the opening 20 possible in the manner shown in FIG. 4, the distance between the planes 16 and 17 shown in chain lines in FIG. 4 must be smaller than the width of the opening 20. The plane 16 is so determined that it intersects the surface 13 of the additional locking lug 10 and the flat zone 3 of the pin 2 at the same angles $\gamma$, in such a way that the distance of the intersecting lines with the surface 13 and the flat zone 3 is equal to the wall thickness d of wall 21. The fact is that if these two intersecting lines bear against the corners of the wall 21, so that the plane 16 lies in the boundary surface of the anchoring opening 20, there must be no contacting between the side remote from the surface 12 of the additional locking lug 10 and the opposite boundary surface of the anchoring opening 20, so that introduction into the anchoring opening 20 is possible to obtain the position shown in continuous lines in FIG. 4. For this reason even this critical zone of the additional locking lug 10 has the chamfering 9, by which the distance between the planes 16 and 17 is reduced, while the flattening 3 of the pin 2 enables this side to be moved nearer to the right-hand boundary surface of the anchoring opening, as viewed in FIG. 4, without the chamfering 9 resulting in an excessive weakening of the locking lug 5.

The inclined surface 8 (FIG. 1) of the free end of the locking lug 5 allows introduction into the anchoring opening 20, without the free end hooking on the curved edge of the anchoring opening.

In the position shown in continuous lines in Fig. 4, the hooking-in fitting occupies the position also shown in continuous lines in FIG. 3, the shape of the flattened zone 3 of the pin 2 and also the transitional zone to the circular peripheral surface 4 being adapted to the contour of the anchoring opening 20. If the bar 1 is now moved by pivoting through the angle $\alpha$ into the vertical position and then by further pivoting through the angle $\beta$ (of preferably 45°, but generally over an angle of about 20° to about 50°) into the clamping position, the locking lug 5 and the additional locking lug 10 are displaced into the position shown in chain lines, in which the wall 21 is engaged behind on the two opposite sides of the anchoring opening 20, so that the hooking-in fitting is reliably located. In this position the circular perpiheral surface 4 of the pin 2 also rests in the lower semi-circular edge zone, i.e. the lower lip of the anchoring opening 20, and the pin is borne over its whole surface, resulting in a satisfactory distribution of the forces to be absorbed, merely by slight deviations of the radius of the circular peripheral surface 4 from the radius of such lower edge zone.

Figure 5:
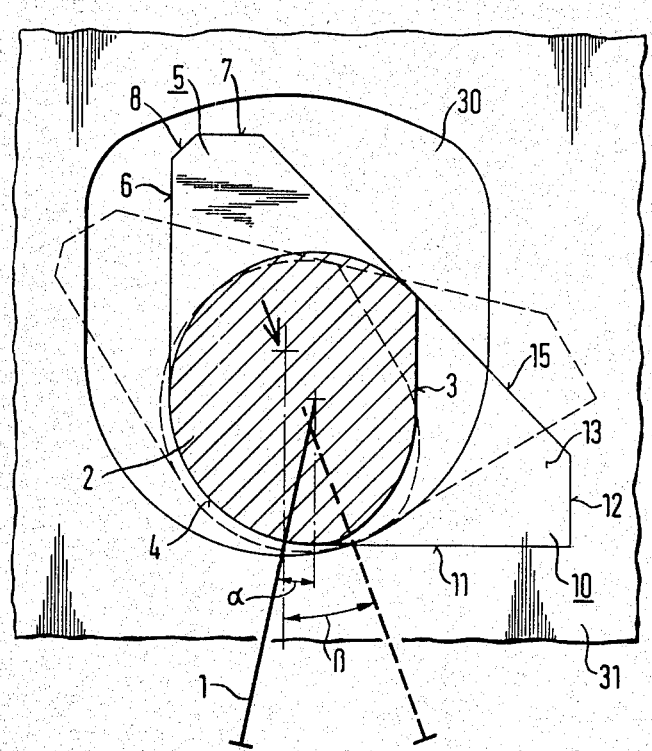
Figure 6:
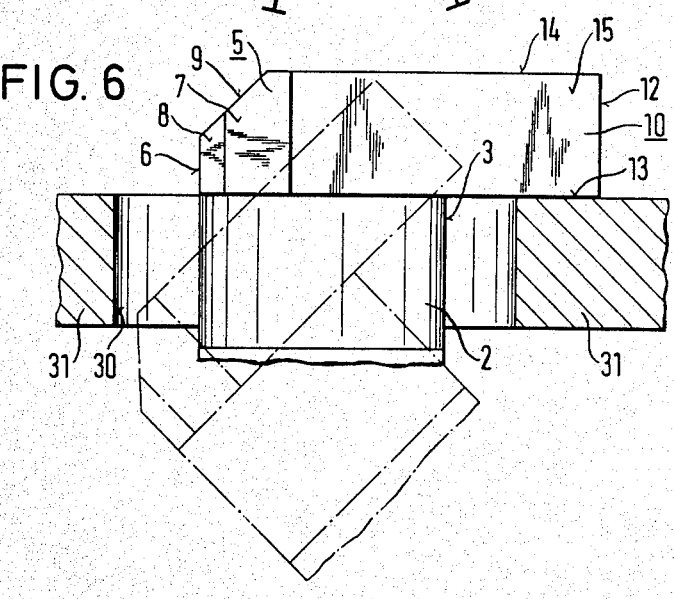

FIGS. 5 and 6, which correspond to FIGS. 3 and 4, show the insertion of the hooking-in fitting into an end-face anchoring opening 30 of a top container corner.

The introduction of the additional locking lug into the anchoring opening is substantially less critical than the introduction into the anchoring opening 20, purely since the width of the anchoring opening 30 is clearly larger, although even in this case the wall 31 is reliably engaged-behind to the left and to the right on opposite sides of the anchoring opening.

It should be mentioned that the distance as shown in FIG. 1 between the free ends of the locking lug 5 and the additional locking lug 10 is larger than the maximum width of the anchoring opening 30 and generally also larger than the maximum height of the anchoring opening 20. Moreover, it is important that the length of the locking lug 5 and the length of the additional locking lug 10 should be so selected that each on its own is long enough to engage behind the associated wall.

As already stated, a particular arrangement of locking lug and additional locking lug is in each case suitable only for clamping the lashing bar in one direction, so that for clamping in the other direction either another lashing bar is used, or a lashing bar must be employed which has two corresponding arrangements of locking lug and additional locking lug as shown, for instance, in FIG. 2.

In the arrangement illustrated in FIG. 2, for instance, the pin 2' and the locking lug and additional locking lug attached thereto project outwardly over the bar when the locking lug 5 and the additional locking lug 10 are latched into the anchoring opening of a container corner. More particularly, when the lashing bar is attached in the anchoring opening of a top container corner, the overlap may result in the introduction of a further lashing bar into an anchoring opening of a bottom container corner disposed thereabove being impeded. Such difficulties are obviated by a lashing bar such as the one illustrated in FIGS. 7 and 8. This lashing bar has at one end a hooking-in fitting of the type already described, with a pin 2, having a flattened portion 3, and a locking lug 5 and an additional locking lug 10 attached thereto. Disposed at the opposite end of the bar 1 is a correspondingly shaped pin 2", which extends in the same direction as the 2—i.e., lies in the same axial plane in relation to the bar 1 and has a flattened portion 3" which is provided on the same side in relation to the bar 1 as the flattened portion 3. Disposed at the end of the pin 2" is a locking lug 5" and an additional locking lug 10". The additional locking lug 10" bears against the same side of the bar 1 as the additional locking lug 10, i.e. the locking lug and additional locking lug of the hooking-in fittings formed at the ends of the bar 1 are constructed laterally inverted, i.e. as a mirror image in relation to a plane normal to the longitudinal axis of the bar 1.

As can be gathered more particularly from FIG. 8, the hooking-in fitting with locking lug 5 and additional locking lug 10 is used for clamping the lashing bar at an inclination to the right downwards, while the hooking-in fitting with the locking lug 5" and the additional locking lug 10" is used when the lashing bar must be clamped at an inclination to the left downwards. The particular hooking-in fitting not required can, for instance, be connected to a turnbuckle which is used for clamping the lashing bar and can for this purpose be formed with an opening which has the same dimensions as the narrower anchoring opening 20 (FIG. 3) of a container corner.

What is claimed is:

1. A lashing bar for incorporation in a lashing assembly for lashing containers to the deck of a ship, where the containers each have upper and lower corners provided with means defining anchoring openings with mouths of two different respective standard perimetrical figures, each opening being enlarged to the left, to the right internally of its mouth so that a perimetrical edge is defined at the mouth to the left, to the right and upwardly of a lower lip thereof, where the standard perimetrical figure of each bottom corner end opening, each bottom corner side opening and each upper corner side opening is generally that of a vertically elongated rectangle with substantially semi-circular upper and lower ends, and where the perimetrical figure of each upper corner end opening is generally that of a square with a substantially semi-circular lower end and a slightly arched upper end, said lower ends each providing a respective said lower lip, said lashing bar being constructed and engaged for alternative locking in said corner openings without regard to which of said two different standard perimetrical figures of mouth such corner openings have, and comprising:

a longitudinally elongated bar having a longitudinal axis and two opposite ends;

a hooking-in fitting provided on one end of said bar, this hooking-in fitting being adapted to be selectively, alternatively introduced into each of said openings and to clamp therein to the respective corner, by including:

a pin mounted on said one end of the bar, said pin having a longitudinal axis extending substantially perpendicularly to the longitudinal axis of the bar, this pin having an outer peripheral surface extending angularly about said longitudinal axis of said pin, and a first locking lug attached to the pin so as to have a base on the pin and a free end located remotely of the pin;

said first locking lug extending from base to free end, generally longitudinally of the bar, and from the pin in a direction away from the end of said bar which is opposite to said one end;

said first locking lug having a maximum width, measured transversally of its base, which is smaller than the maximum width of the mouth of each said standard lower corner anchoring opening;

the distance between said free end of said first locking lug and whichever is the furthest therefrom of (a) the furthest opposite side portion of said peripheral surface of said pin from where said first locking lug is based on said pin, and (b) the furthest extent of said first locking lug from said free end thereof, being smaller than the height of the mouth of each said standard lower corner anchoring opening, but sufficiently large as to permit said first locking lug after, entering a said standard upper corner end opening to engage the respective container upper corner marginally of the respective opening mouth from within the respective end opening upon angular displacement of said bar at least generally about said longitudinal axis of said pin toward a clamping position adjacent the respective container;

said lashing bar being further characterized in having:

an additional locking lug attached to said pin so as to have a base on the pin and a free end located remotely of the pin;

said additional locking lug extending radially outwardly of the pin and being displaced angularly about said longitudinal axis of said pin from the first-described locking lug by an amount sufficient that when said bar is in said clamping position said additional locking lug engages the respective container upper corner marginally of the respective opening mouth from within the respective opening across the respective opening mouth from where said first-described locking lug is engaged;

said first locking lug and said additional locking lug comprising respective, plate-like members each having opposite faces, corresponding ones of which are substantially coplanar, and each having an edge which proceeds from the respective base to the respective free end to provide respective outer edge portions disposed relatively distally of one another, and around the respective free end and back to the respective base to provide respective inner edge portions disposed relatively proximally of one another;

the two said outer edge portions, respectively of said first locking lug and said additional locking lug extending tangentially of said peripheral surface of said pin, each from the respective said base toward the respective said end at respective sites disposed substantially 90° apart angularly of said peripheral surface;

said first and additional locking lugs being disposed on the pin relative to where the pin is mounted on the bar with such angular spacing between the free ends of the respective said locking lugs and the longitudinal axis of the bar, that, for insertion of the locking lugs of the hooking-in fitting into a said anchoring opening, the bar must be angled at about 5° to about 15° to vertical about the longitudinal axis of said pin while tilted outwards from having the longitudinal axis thereof lying in an imaginary vertical plane sufficiently to permit the additional locking lug to be inserted through the respective said opening mouth above the respective said lower lip and hooked behind the respective said perimetrical edge to the left or to the right of, but above the respective said lower lip, tilted inwards to have said longitudinal axis thereof lie in an imaginary vertical plane and to cause said first locking lug to be inserted through the respective opening mouth, and, that for bringing the thus-inserted hooking-in fitting to its clamping Position, the bar must be rotated through vertical about the longitudinal axis of said pin and then past vertical through another about 20° to about 50°, and neither during such insertion nor during such angling, outward tilting, inward tilting and rotating to said clamping position need either of said locking lugs pass below the said lower lip of the respective said opening while disposed within the respective said opening.

2. The lashing bar of claim 1, wherein:
said peripheral surface of said pin is generally cylindrically rounded but includes a flattened segment which at least generally faces the free end of said additional locking lug.

3. The lashing bar of claim 1, wherein:
said respective outer edge portions extend at approximately a right angle to one another.

4. The lashing bar of claim 1 wherein:
said pin extends both forwardly and rearwardly of said bar so as to have two ends, said first-mentioned and additional locking lugs being provided at one of said ends of said pin, and both being duplicated in mirror image at the opposite end of said pin wherein said lashing bar is adapted to be selectively used in two angularly opposite clamping positions.

5. The lashing bar of claim 1 further including:
a replication of said hooking-in fitting provided on the opposite end of said bar, on the same side of the bar as the first-described hooking-in fitting, but having a mirror image angular orientation of its two locking lugs relative to its pin compared with that of the first-described hooking-in fitting.

* * * * *